United States Patent
Hill et al.

(10) Patent No.: US 12,051,053 B2
(45) Date of Patent: Jul. 30, 2024

(54) SECURED, UNIFIED, MULTIFUNCTIONAL, DIGITAL CURRENCY STORE WITH MACHINE-READABLE CARD AND/OR MOBILE APP

(71) Applicant: Bank of America Corporation, Charlotte, NC (US)

(72) Inventors: Rosemary Hill, Jacksonville, FL (US); Linda Haddad, San Francisco, CA (US); Susan Moss, Vestal, NY (US); Kathleen D. Schaumburg, Charlotte, NC (US); Nancy T. Carrier, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/112,704

(22) Filed: Feb. 22, 2023

(65) Prior Publication Data
US 2023/0245090 A1 Aug. 3, 2023

Related U.S. Application Data

(62) Division of application No. 17/345,396, filed on Jun. 11, 2021, now Pat. No. 11,631,072.

(51) Int. Cl.
*G06Q 20/28* (2012.01)
*G06Q 20/20* (2012.01)
(Continued)

(52) U.S. Cl.
CPC ............. *G06Q 20/28* (2013.01); *G06Q 20/20* (2013.01); *G06Q 20/3223* (2013.01);
(Continued)

(58) Field of Classification Search
None
See application file for complete search history.

(56) References Cited

U.S. PATENT DOCUMENTS 7,363,265 B2   4/2008   Horgan
8,560,452 B2   10/2013  Lynch et al.
(Continued)

FOREIGN PATENT DOCUMENTS

| KR | 20130105191 A | 9/2013 |
| KR | 101409148 B1 | 6/2014 |
| MX | 2011007464 A | 10/2011 |

*Primary Examiner* — Scott S Trotter
*Assistant Examiner* — Amit Patel
(74) *Attorney, Agent, or Firm* — Banner & Witcoff, Ltd.

(57) ABSTRACT

A prepaid electronic funds transferring system, components, and method is provided for users that do not have checking or savings accounts. A user has a digital currency store such as, for example, in a non-checking non-savings prepaid account associated with a secure unified prepaid banking card and/or smartphone app. Interest may be provided by an issuer on funds in the digital currency store. Debit and credit transactions may be processed. NFC and UWB geo-locating can be used to find lost cards and/or the mobile device on which the app is loaded. Electronic transactions may be received and performed without requiring a recipient to download an app. Secure semiconductors may facilitate wireless and non-wireless communications with ATMs and POS machines. QR codes may identify accounts, constitute private/public encryption keys, or other relevant info. A cold storage or hot storage system may be implemented for the digital currency store.

11 Claims, 9 Drawing Sheets

(51) Int. Cl.
    *G06Q 20/32*     (2012.01)
    *G06Q 20/34*     (2012.01)
    *G06Q 20/38*     (2012.01)
    *H04W 4/021*     (2018.01)
    *H04W 4/80*     (2018.01)

(52) U.S. Cl.
    CPC ....... *G06Q 20/3278* (2013.01); *G06Q 20/352* (2013.01); *G06Q 20/3829* (2013.01); *H04W 4/021* (2013.01); *H04W 4/80* (2018.02); *G06Q 2220/00* (2013.01)

(56) References Cited

U.S. PATENT DOCUMENTS

| | | |
|---|---|---|
| 2005/0080737 A1 | 4/2005 | Stein et al. |
| 2005/0277462 A1 | 12/2005 | Ellis |
| 2009/0010801 A1 | 1/2009 | Murphy et al. |
| 2013/0046687 A1 | 2/2013 | Simpson, Jr. |
| 2022/0122062 A1* | 4/2022 | Mayblum ............ G06Q 20/381 |

* cited by examiner

SECURED, UNIFIED, MULTIFUNCTIONAL, DIGITAL CURRENCY STORE WITH MACHINE-READABLE CARD AND/OR MOBILE APP

CROSS REFERENCE TO RELATED APPLICATIONS

This application is a divisional of and claims priority to co-pending U.S. application Ser. No. 17/345,396, filed Jun. 11, 2021, and entitled "Secured, Unified, Multifunctional, Digital Currency Store with Machine-Readable Card and/or Mobile App," which is incorporated herein by reference in its entirety.

TECHNICAL FIELD OF DISCLOSURE

The present disclosure relates to processes, machines, and apparatus for electronic funds transferring with electronic security means to protect against fraudulent use.

BACKGROUND

Prepaid cards, including gift cards, are well known. A gift card can be purchased from a merchant, given to a recipient, and used by the recipient to purchase a product. The use of such cards substantially simplifies a gift or other purchasing process. Various merchants, credit card companies, and payment providers offer prepaid cards and/or gift cards.

Debit cards are well known and may be linked to bank accounts, including checking and savings accounts. Debit cards can be used to make purchases, deposit funds into bank accounts, or withdraw funds from bank accounts.

Credit cards, such as MasterCard, Visa, and American Express, are well known. Credit cards can be used to purchase items or get cash advances on a charge account. Bank accounts can be linked to credit cards in order to facilitate charge account payments for purchases previously made and to make cash-advance withdrawals. Credit cards can be prepaid such that they have a positive account balance as opposed to a negative charge account balance.

Prepaid cards, debit cards, and credit cards may be formed out of plastic or metal. They may have a visible card number printed thereon. A magnetic strip can be incorporated into to identify a credit or debit card account and may be secured by an embedded semiconductor chip.

No prepaid card, debit card, or credit cards provide interest on funds. Debit cards and credit cards can charge a user interest, but they do not, in and of themselves, provide interest on funds to customers.

Digital wallets are well known. A digital wallet can reside in a user's smart phone and can be used to make a purchase electronically. Digital wallets may incorporate prepaid cards, debit cards, and credit cards.

For various reasons, customers may not have, may not be able to obtain, or may not want to have a bank account, and therefore will not have an associated debit card. Similarly, customers may not have, may not be able to obtain, or may not want to have a credit card account, let alone one linked to a bank account. Accordingly, these customers are unable to reap bank account benefits such as obtaining interest on their money or obtain credit card benefits such as purchase rewards (e.g., cash back awards, travel awards, restaurant rewards, loyalty rewards, reward points, etc.). Moreover, without such accounts, users may have difficulty or be unable to send money, receive money, transfer funds, or store money electronically in a digital wallet, let alone do so in a secured manner. Additionally, there is no mechanism to locate lost or stolen cards.

SUMMARY

Aspects of this disclosure address one or more of the shortcomings in the industry by, inter alia, providing a secured, unified, multifunctional, digital currency store in conjunction with a machine-readable card and/or app on a smart phone or other mobile device. The digital currency store may be prepaid and may be a non-checking non-savings prepaid account, may correspond to such an account, and/or may be linked to that type of account. Alternatively, any type of mobile repository for prepaid funds may be used as a digital currency store. The digital currency store may reside as cold storage entirely on a machine-readable card and/or within an app, such as a digital wallet, on a smart device, or may be linked as hot storage in a single unified account. The digital currency store is machine-readable by magnetic strip(s), embedded chip(s), near-field communication (NFC) short-range wireless connectivity technology, ultra-wideband (UWB) wireless connectivity, RFID, and/or quick response (QR) code(s) or other electronically scannable or identifiable means. The digital currency store can be secured: by electromagnetic shielding, embedded chip(s), masking, or other physical means; cryptographically by encryption and/or decryption public and private keys; by refraining from printing an account number on the card; by decentralized blockchain technology such as transaction ledgers; by facial recognition, fingerprint recognition, and/or other biometrics; by UWB and/or NFC location detection; and/or by password(s) and/or pins. The digital currency store is multifunctional in that it: can provide benefits such as interest as well as rewards for purchases; can be used to make purchases, send/receive money without accounts, and transfer funds; can be reloaded electronically in a direct manner by a user or in an indirect manner by a third-party with subsequent user authentication or acceptance of the electronic transaction; and/or can be reloaded in a manual manner by a cash deposit at a bank or automated teller machine (ATM).

In light of the foregoing background, the following presents a simplified summary of the present disclosure in order to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions of this application are disclosed in the specification throughout this application along with exemplary, non-exhaustive, and non-limiting manners and processes of making and using the inventions, in such full, clear, concise, and exact terms in order to enable skilled artisans to make and use the inventions without undue experimentation and sets forth the best mode contemplated by the inventors for carrying out the inventions.

In some arrangements, a prepaid electronic funds transferring method may be implemented for a user with a smartphone when the user does not have a checking account or a savings account. The method can be used based on interactions with the smartphone and automated teller machine(s) (ATMs) and/or a point-of-sale machine(s) (POS). An institution can provide a secure unified prepaid banking card to the user. A prepaid banking server can link a non-checking non-savings prepaid account to the card, fund the prepaid account with an initial or other amount, provide interest on some or all funds held in the prepaid account, process debit and/or credit requests from ATMs or POS machines if the debit request is equal to or less than the amount in the prepaid account, and process deposit requests for deposits received at an ATM or other means. The prepaid banking server can receive electronic transfers to the prepaid account and can deposit in the prepaid account the electronic transfers without requiring the user to download a prepaid banking server app or other app to the user's smartphone. Wireless communication between the card, smartphone, ATMs, and/or POS machines can be accomplished via Bluetooth, Wi-Fi, UWB, NFC, or the like. Geo-locating of the card, if lost, can similarly be accomplished by wireless means such as by UWB/NFC networking and/or triangulation. Communications between the card and/or smartphone and either ATMs or POS machines can be secured with one or more security chips to secure both wireless and non-wireless communications. One or more quick reference (QR) codes may be used to identify the prepaid banking account, digital currency store, and/or associated public/private encryption key(s), which may be used in order to facilitate blockchain transaction implementation of the prepaid digital currency store or transactions regarding the same.

In some arrangements, a secure unified banking card can be used in transactions in a prepaid electronic funds transferring system that includes ATM(s) and POS machines. The card can be made of a metal or plastic laminate, or other suitable configuration. The card can include geo-locating functionality for geo-locating the laminated card if lost, the geo-locating functionality can be embedded within the card. Secure wireless communication functionality can be provided to secure wireless communications with the ATM and the POS to facilitate deposits, withdrawals, credit charges, and transfers for a non-checking non-savings prepaid account associated with the card, and can also be embedded within the card. Security chip functionality can be used to enable secure non-wireless communications when the card is physically inserted into the ATM or the POS to facilitate the deposits, the withdrawals, the credit charges, and the transfers for the prepaid account associated with the card, and can also be embedded within the card. A machine-readable magnetic strip can be included on or in the card to identify, inter alia, the prepaid account.

In some arrangements, a first machine-readable quick reference (QR) code can be printed on the card that is a public encryption key for the digital currency store or prepaid account.

In some arrangements, a second machine-readable quick reference (QR) code can be printed on the laminate that is a private encryption key for the digital currency store or prepaid account.

In some arrangements, the prepaid card is able to be used to at the ATM as a debit card and at a POS as a credit card. Balance limits or other thresholds may be used to determine whether to fund or process debit and/or credit transactions.

In some arrangements, the prepaid account associated with the card or smartphone app bears interest and/or rewards are provided for credit transactions.

In some arrangements, the geo-locating functionality of the prepaid card includes at least one near field communications (NFC) semiconductor and/or at least one ultra-wideband (UWB) semiconductor.

In some arrangements, the prepaid card and/or smartphone app can include means for providing cold storage of currency or linking to hot storage of currency.

In some arrangements, a prepaid electronic funds transferring system can be provided for use with an ATM, an automated clearing house (ACH), and POS machine, by a user having a smartphone with a prepaid banking app and/or a secure unified prepaid banking card. The user is capable of sending an encrypted outgoing transfer of funds, receiving an encrypted incoming transfer of funds to or from a third party, and can receive gift cards to transfer funds. Receipts of electronic funds can, in some arrangements, be accomplished without requiring users to download a particular app to their smartphone.

In some arrangements, a prepaid electronic funds transferring system can include a prepaid banking server, which can have: at least one server processor, at least one server communication interface communicatively coupled to the at least one server processor, and a server memory communicatively coupled to the at least one server communication interface. The server memory can store server computer-readable instructions that, when executed by the at least one server processor, cause the prepaid banking server to: create, by the at least one server processor, a non-checking non-savings prepaid user account, store, by the at least one server processor in the server memory, the prepaid user account; process, by the at least one server communication interface, funding instructions to fund the prepaid user account with an initial currency amount; store, by the at least one server processor in said server memory, the initial currency amount for the prepaid user account; and/or calculate daily, by the at least one server processor in said server memory, interest for the digital currency store or prepaid user account.

The instructions may also: process, by the at least one server processor in real time, encrypted deposit instructions, received by the at least one server communication interface from the ATM network, to increase the prepaid user account by a deposit amount; receive, by the at least one server processor in real time from the at least one server communication interface, an encrypted debit request from an automated clearing house (ACH) to decrease the prepaid user account by a debit amount; decrypt, by the at least one server processor in real time, the debit request; calculate, by the at least one server processor in real time, whether the debit amount exceeds available funds in the prepaid user account; fund, by the at least one server processor in real time, the debit request if the available funds is at least equal to the debit amount; reject, by the at least one server processor in real time, the debit request if the available funds does not exceed the debit amount; receive, by the at least one server processor in real time from the at least one server communication interface, an encrypted credit request to decrease the prepaid user account by a credit amount; decrypt, by the at least one server processor in real time, the credit request; calculate, by the at least one server processor in real time, whether the credit amount exceeds available funds in the prepaid user account; and/or fund, by the at least one server processor in real time, the credit request if the available funds is at least equal to the debit amount.

The instructions may further: reject, by the at least one server processor in real time, the credit request if the available funds does not exceed the credit amount; process, by the at least one server processor in real time, encrypted transfer instructions, received by the at least one server communication interface from the a prepaid banking app, to increase the prepaid user account based on the accepted transfer funds; transmit, by the at least one server processor in real time through the at least one server communication interface over the Internet to the at least one smartphone communication interface in response to a download request from the smartphone, the prepaid banking app; award, by the at least one server processor to the prepaid user account, at least one reward based on the debit requests and the credit requests that were funded; process, by the at least one server processor, the encrypted incoming transfer and the encrypted outgoing transfer, received from the prepaid banking app, in order to increase or decrease the prepaid user account; store, by the at least one server processor in real time in the prepaid user account in said server memory, updated amounts for accepted transactions based on the deposit amount, the debit amount, the credit amount, and for the encrypted incoming transfers, the encrypted outgoing transfer, and the gift card information; process, by the at least one server processor, a balance request received from the prepaid banking app and transmit an account balance to the prepaid banking app in response to the balance request; and/or process, by the at least one server processor, the gift card information received from the prepaid banking app in order to increase the prepaid user account in accordance with the gift card.

In some arrangements, a prepaid electronic funds transferring system can include a secure unified banking card. The card can have UWB and/or NFC geo-locating functionality in the card to locate the card if lost. The card may also have machine-readable means to enable the ATM and the POS to read account identifying indicia on the card corresponding to the prepaid user account and the prepaid banking server. The card may also have security functionality to secure the card against fraud. Wireless communication functionality can be provided to enable wireless communication between the card and ATMs and/or POS machines. User-identifying indicia and/or contact information can be printed on the card.

In some arrangements, a prepaid electronic funds transferring system can include a prepaid banking app residing in a smartphone's memory after having been downloaded in response to a download request. The prepaid banking app can include or be used in conjunction with a digital wallet. The smartphone memory can store smartphone computer-readable instructions that, when executed by the at least one smartphone processor, cause the smartphone to: receive, by the smartphone processor from the at least one smartphone communication interface over the Internet, the encrypted incoming transfer from the third party; accept or reject, by the smartphone processor, the incoming encrypted transfer from the third party; transmit, to the prepaid banking server over the Internet through the smartphone communication interface, the encrypted incoming transfer if accepted by the user; send, by the smartphone processor over the Internet through the smartphone communication interface to the prepaid banking server, the encrypted outgoing transfer for the third party; transmit, to the banking server over the Internet through the smartphone communication interface, the account balance request; receive, from the banking server over the Internet through the smartphone communication interface, the account balance in response to the account balance request; scan, by the smartphone processor utilizing the smartphone camera, the gift card in order to identify the gift card information; and/or transmit, by the smartphone processor over the Internet to the prepaid banking server, the gift card information in order to increase the prepaid user account in accordance with the gift card.

In some arrangements, account identifying functionality can include at least one quick reference (QR) code printed on the card to identify the prepaid user account and the banking server.

In some arrangements, QR code(s) can be an encryption key. It could be either a public encryption key or a private encryption key. Codes can be printed on the same side of the card or on different sides of the card for privacy or security reasons.

In some arrangements, the prepaid banking card may contain encrypted non-volatile memory.

In some arrangements, the prepaid banking card may constitute cold storage of currency or be linked so as to constitute hot storage of currency.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
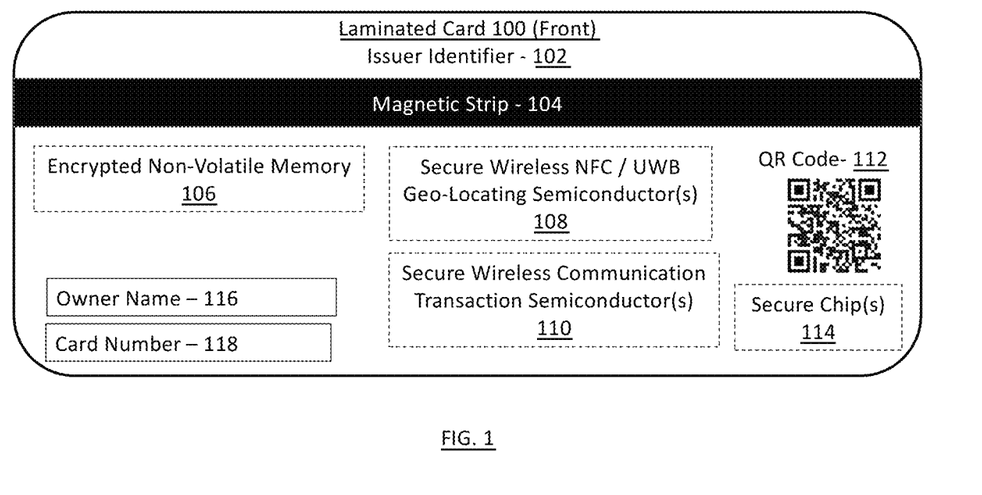
FIG. 1 depicts an example front side of a prepaid banking card for a secured, unified, multifunctional digital currency store in accordance with one or more aspects of the disclosure.
Figure 2:
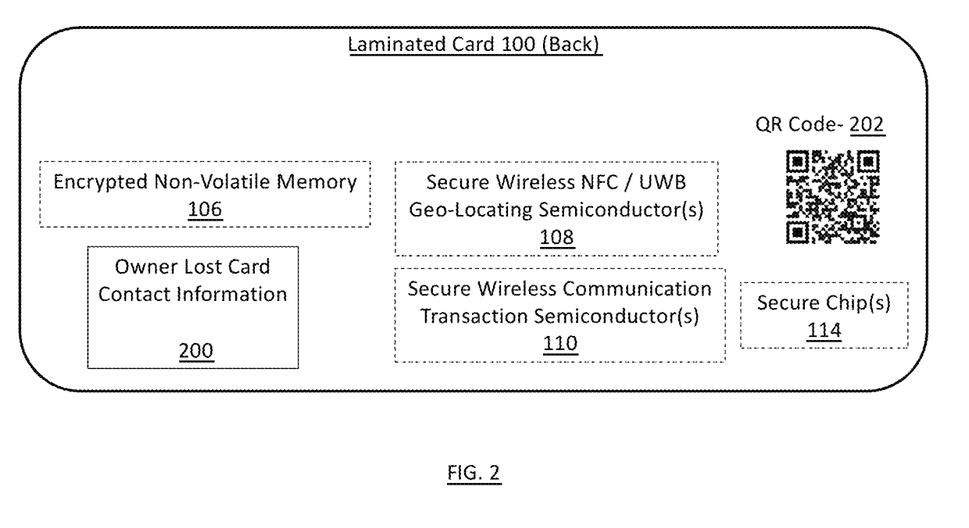
FIG. 2 depicts a sample back side of prepaid banking card for a secured, unified, multifunctional digital currency store in accordance with one or more aspects of the disclosure.

FIGS. 1 and 2 illustrate a potential front side and back side of prepaid banking card(s) 100 in accordance with one or more aspects of the disclosure. Anything noted as being on the front side of the card could additionally and/or alternatively be provided on the back side of the card, and/or visa versa.

The card 100 may constitute a plastic laminate or metallic laminate. Alternatively, the card 100 could be constructed or constituted in accordance with any other known method of providing debit or credit cards or structure for such cards. The card 100 may include indicia 102 that identifies the issuer of the card or the holding source or manager for the digital currency store.

Various forms of machine-readable mechanisms that perform various machine functionality may be provided on or embedded in the card 100. For example, the card 100 may include a magnetic strip 104 for identifying the non-checking non-savings prepaid digital currency store 340 or other prepaid account associated with the card and/or the issuer 102. Encrypted non-volatile memory 106 may also be provided to store digital currency information, account information, blockchain information, currency store information, wallet information, or the like. The memory 106 may be used in conjunction with other components and systems to provide cold storage of currency as described in more detail infra.

One or more secure wireless NFC and/or UWB geo-locating semiconductors 108 may be used to enable NFC and/or UWB devices to triangulate or otherwise detect and locate the card 100 if it is lost or stolen. One or more secure wireless communication transaction semiconductors 110 can be used to facilitate wireless transactions and communications between the card 100 and ATMs 316 and/or POS machines 328. One or more scannable QR codes 112 (and 202 as in FIG. 2) can be provided to identify prepaid accounts, account issuers, and/or private and/or public encryption keys for the prepaid banking account. In one arrangement, a first QR code (e.g., 112) might be for a public encryption key and a second QR code (e.g., 202) might be for a private encryption key. For security reasons, the first 112 and second 202 QR codes may be on different sides of card 100 such that if the front side of the card (e.g., public key) is presented to a merchant or third party to facilitate a transaction, the back side of the card with the private key will not be revealed.

One or more security chips 114 may also be provided to secure non-wireless communications between the card 100 and ATMs 316 and/or POS machines 328 such as, for example, when the card 100 is physically inserted into an ATM or POS reader.

If desired, the owner name 116 of the prepaid banking account may be printed on the card 100. The prepaid banking account number or corresponding card number 118 may also be printed on the card 100. Or, for security or privacy reasons, the owner name 116 and account information 118 may be omitted from the card. Owner lost card and/or contact information 200 may also be identified on the card 100 if desired.

Figure 3:
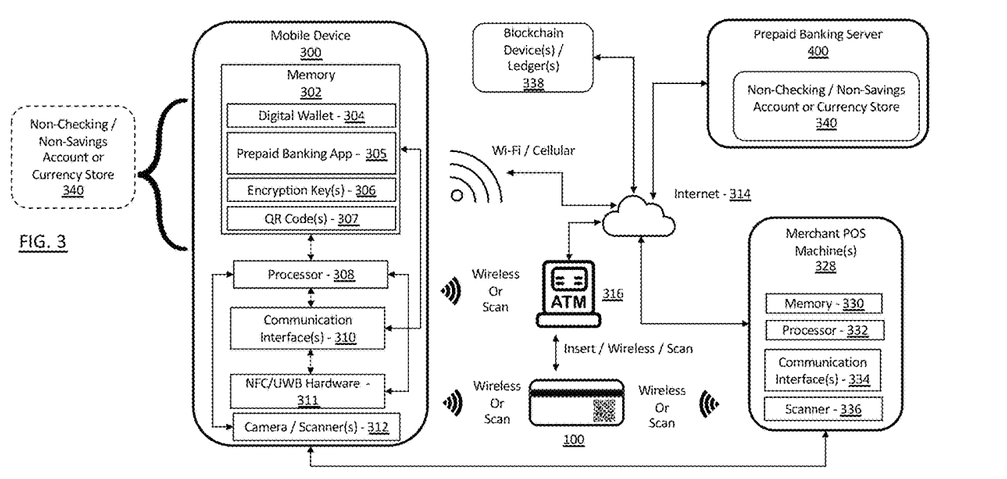
FIG. 3 is a functional diagram illustrating the interconnection and interaction of various components in a prepaid electronic funds transferring system in accordance with one or more aspects of the disclosure.

FIG. 3 is a functional diagram illustrating the interconnection and interaction of various components in a prepaid electronic funds transferring system in accordance with one or more aspects of the disclosure.

The prepaid electronic funds transferring system may include prepaid banking card 100, which is linked to the prepaid digital currency store 340 and/or other non-checking non-savings account. The prepaid electronic funds transferring system may also include a smartphone or like mobile device 300 with corresponding digital wallet 304 or processing functionality.

The mobile device 300 may include volatile and/or non-volatile memory 302 to store a digital wallet 304 (or implement digital wallet functionality) and a prepaid banking app 305. The wallet 304 may be a separate module in memory or may be included as part of the prepaid banking app 305. Private and/or public encryption keys 306 may be generated and/or stored electronically in memory 302 using standard cryptography. Preferably, prepaid banking server 400 will generate both a private and public encryption key and will communicate the keys with the prepaid banking app 305 over the Internet 314 during setup of the non-checking non-savings prepaid account. QR codes 307 may also be generated by the server 400 and used by the app 305 on the mobile device 300. The QR codes 307 may identify an issuing entity, a prepaid banking account, a number corresponding to the prepaid banking account, a public encryption key, and/or a private encryption key. The QR codes 307 (or 112 and 202 as printed on the card) may be used to implement cold storage for the prepaid digital currency store on the card 100 and/or be linked to implement hot storage for the prepaid digital currency store.

In simple terms, cold storage in the context of this disclosure refers to keeping a user's digital currency store completely offline. Cold storage, also known as a cold storage wallet, is the opposite of a hot wallet where a digital currency store is kept online. Keeping a digital currency store online increases a user's risk for the asset to be stolen when kept online using a custodial service. Accordingly, cold storage may be beneficial. By keeping the digital currency store in cold storage, attack threat vectors may be diminished.

Funds may be added to the non-checking non-savings digital currency store 340 in cold storage by, for example, scanning a QR code or copying an address and sending the funds to the digital currency store. Funds may be similarly sent by importing a private key for a digital wallet that is online. Any wallet that supports importing private keys will work.

The non-checking non-savings prepaid digital currency store 340 may be implemented in various ways on the mobile device 300 and/or unified card 100. For example, it may be stored and handled in digital wallet 304 in memory 302 on mobile device 300 and/or in encrypted non-volatile memory 106 on card 100. Or it may reside in a prepaid banking app 305 in memory 302. It can be secured and/or accessed with encryption keys 306, QR codes 112, 202, 307. Security chip(s) 114 may also be used to store or otherwise secure the digital currency store 340. Alternatively, the non-checking non-savings prepaid digital currency store 340 may be implemented partially and/or entirely on prepaid banking server 400.

Hardware on the mobile device 300 may include one or more processor(s) 308 which can access the memory 302 and execute computer-executable instructions in memory corresponding to the functions or modules of the digital wallet 304, prepaid banking app 305, encryption key(s) 306, and/or QR codes 307. The processors 308 can communicate directly with memory 302 via a bus or the like through communication interface(s) 310. The processors can also access near-field communications (NFC) and/or ultra-wideband (UWB) hardware 311 in the mobile device 300 to facilitate communications with ATMs 316 and POS machines 328, and can also be used to geo-locate the card 100 or the mobile device 300 if lost via NFC and/or UWB triangulation, networking, or the like. The mobile device 300 may also include a camera or scanner 312 to scan gift cards or QR codes to facilitate transfers, debits, deposits, or credit transactions.

The mobile device 300 may interact wirelessly with card 100 such as, for example, by Bluetooth, Wi-Fi, UWB, and/or NFC through NFC/UWB hardware 311 or communication interface(s) 310, and corresponding secure wireless communication transaction semiconductors 110. Smartphone 300 may also interact wirelessly with card 100 by scanning one or more QR codes 112, 202 on card 100 via a camera or scanner 312.

Similarly, smartphone 300 and/or unified card 100 may interact wirelessly with ATM 316 such as, for example, by Bluetooth, Wi-Fi, UWB, and/or NFC through NFC/UWB hardware 311 or communication interface(s) 310, and/or secure wireless communication transaction semiconductors 110. Smartphone 300 may also interact wirelessly with ATM 316 by scanning one or more QR codes 112, 202 displayed on the ATM screen 316 via a camera or scanner 312. Conversely, the ATM 316 can scan or read QR code(s) 307 on the mobile device 300 or codes 112, 202 on card 100.

Relatedly, smartphone 300 and/or unified card 100 may interact wirelessly with a POS machine 328 to, for example, make purchases from a merchant. Wireless communication may be accomplished by Bluetooth, Wi-Fi, UWB, and/or NFC through NFC/UWB hardware 311 or communication interface(s) 310, and/or secure wireless communication transaction semiconductors 110. POS machine 328 may also be able to scan or read QR code(s) 307 on the mobile device 300 or codes 112, 202 on card 100. Secure non-wireless communication between card 100 and POS machine 328 can be facilitated by security chip(s) 114 that secure transactions when the card 100 is inserted physically into a POS machine 328.

Preferably, mobile device 300 is connected either via cellular service and/or Wi-Fi to Internet 314. And, mobile device 300, ATM 316, blockchain device(s)/ledger(s) 338, prepaid banking servers 400, merchant POS machine(s) 328, may all communicate directly with one another or through Internet 314.

As used herein, blockchain in the context of blockchain device(s)/ledger(s) 338, at a high level, can be considered to be a type of database. The blockchain collects information together in groups, also known as blocks, that hold sets of information regarding the digital currency store. Blocks have certain storage capacities and, when filled, are chained onto the previously filled block, forming a chain of data known as the "blockchain." All new information that follows that freshly added block is compiled into a newly formed block that will then also be added to the chain once filled. The blockchain, structures its data (e.g., prepaid digital currency store and/or information corresponding to the same) into blocks that are chained together. This makes it so that all blockchains are databases but not all databases are blockchains. This system also inherently makes an irreversible timeline of data for the prepaid digital currency store when implemented in a decentralized nature. When a block is filled it is set in stone and becomes a part of this timeline. Each block in the chain is given an exact timestamp when it is added to the chain.

Figure 9:
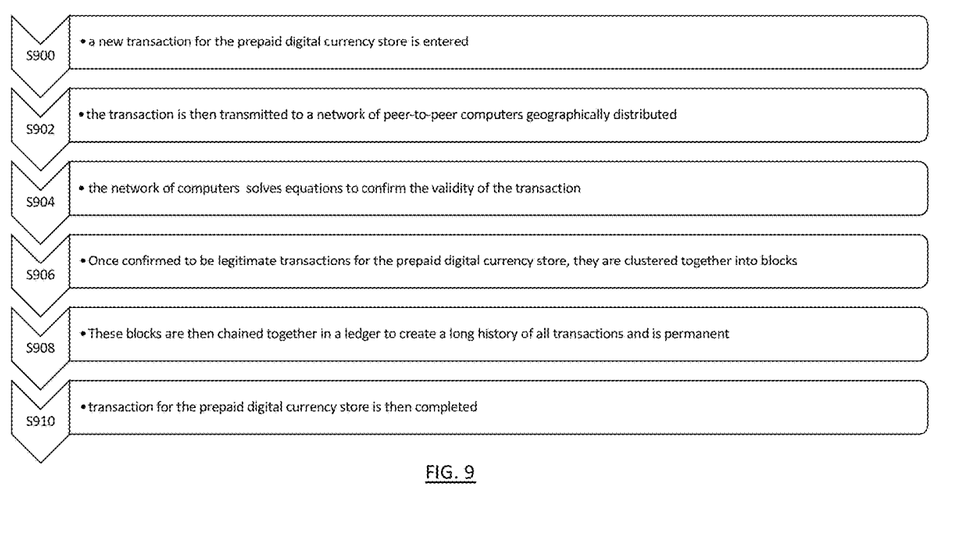
FIG. 9 is a sample process flow diagram illustrating a sample transaction process for implementation a prepaid digital currency store in blockchain device(s)/ledgers in the context of one or more aspects of this disclosure.

A sample transaction process for implementation of blockchain device(s)/ledgers 338 in the context of this disclosure is shown in FIG. 9. In step 900, a new transaction for the prepaid digital currency store is entered. In step 902, the transaction is then transmitted to a network of peer-to-peer computers geographically distributed. In step 904, the network of computers (collectively 338) solves equations to confirm the validity of the transaction. Once confirmed to be legitimate transactions for the prepaid digital currency store, they are clustered together into blocks in step 906. These blocks are then chained together in step 908 in a ledger to create a long history of all transactions corresponding to the digital currency store and is permanent. The transaction for the prepaid digital currency store is then completed in step 910.

Figure 4:
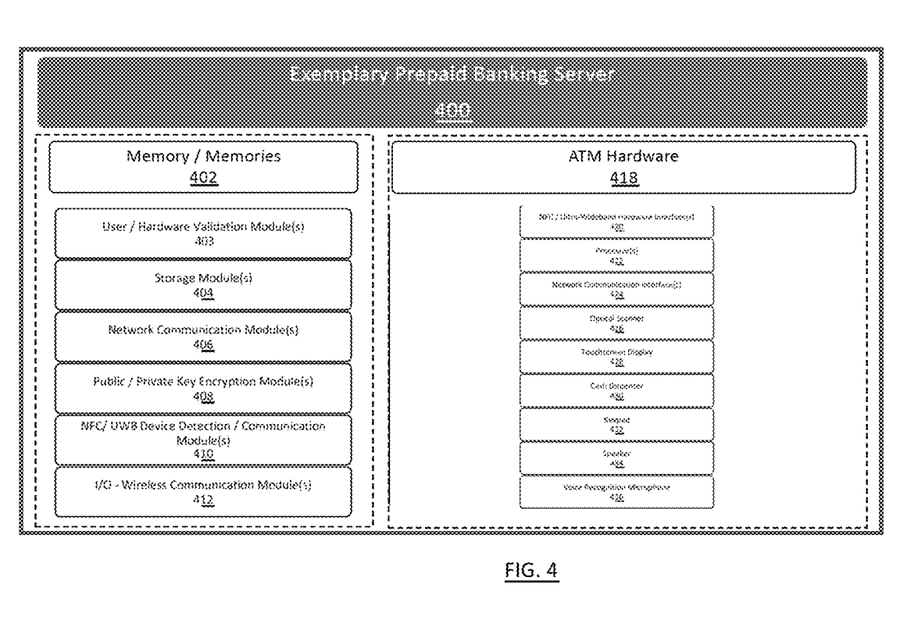
FIG. 4 depicts an exemplary prepaid banking server with hardware and memory components in accordance with one or more aspects of the disclosure.

FIG. 4 depicts an exemplary prepaid banking server 400 with hardware 418 and memory components 402 in accordance with one or more aspects of the disclosure. Various server modules 403-416 for implementing functionality on the server 400, communicating with mobile device 300, handling transactions related to card 100, interacting with users and user devices 300, communicating with blockchain devices 338, and/or handling transactions and communicating with POS machines 328, may be stored in one or more sectors of integrated and/or accessible non-volatile memory, memories, data stores, databases or the like.

As an example, prepaid banking server 400 may utilize user authentication and/or hardware validation module(s) 403 in order to authorize mobile devices 300 to access the server 400 and/or to proceed with transactions on validated and/or registered devices 300. Prepaid digital currency transaction(s) received directly from mobile app 305 or indirectly via use of unified card 100 from may be stored in memory 402 and/or processed in module 404. Network communication module(s) 406 may facilitate direct communications between banking server 400 and mobile device 300 via network communication interface(s) 424, or indirectly with card 100. User information, hardware information, encryption keys, session information, digital currency store prepaid account information, ATM information, POS information, reward information, interest information, etc. may be communicated via module(s) 406 and interface(s) 424.

Public and private encryption keys received from, generated by, and/or distributed by the prepaid banking server 400 can be stored in module 408 and used to enable establishment and securing of communications between servers 400, ATMs 316, POS machines 328, mobile devices 300, and/or unified card 100.

Figure 6:
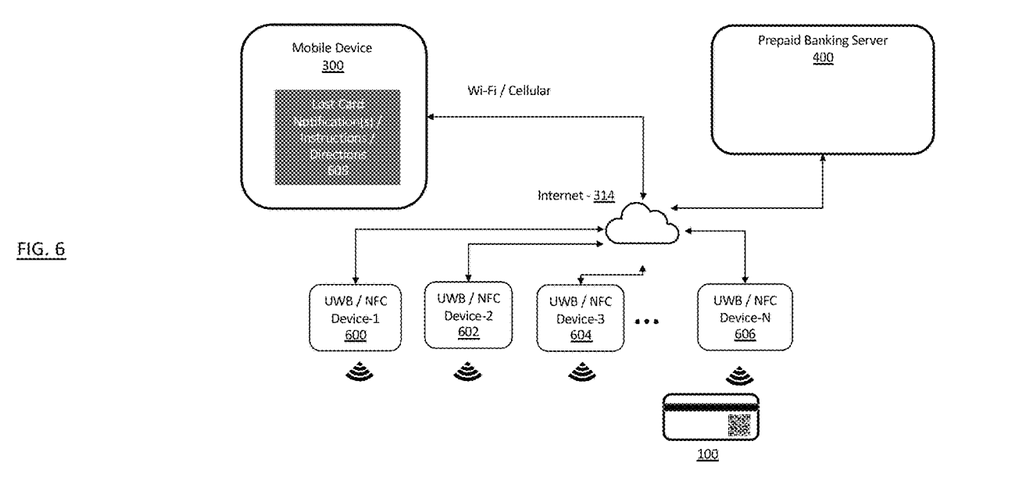
FIG. 6 illustrates the geo-locating functionality to locate lost prepaid banking cards by use of ultra-wideband (UWB) and/or near field communication (NFC) technology in accordance with one or more aspects of the disclosure.

One or more modules 410 may be used to provide detection, location determination, and/or facilitate communication with mobile devices 300 or unified card 100 via NFC/UWB hardware interfaces in ATMs or the like. Such detection of NFC/UWB devices may occur if and/or when the device 300 and/or card 100 comes within NFC/UWB of various devices 600, 602, 604, 606 which can then be communicated to server 400 and the location information for the device 300 or card 100 can be shared with a user, directly or indirectly, to locate a lost card.

Input/output (I/O) and/or wireless communication module(s) 412 in memory 402 may be used to accept inputs via optical scanner 426, touchscreen display 428, keypad 432, and/or voice recognition microphone 436 or the like. Messages may be communicated via display 428 or speaker 434 and/or wirelessly to devices such as, for example, smartphone 300.

Figure 5:
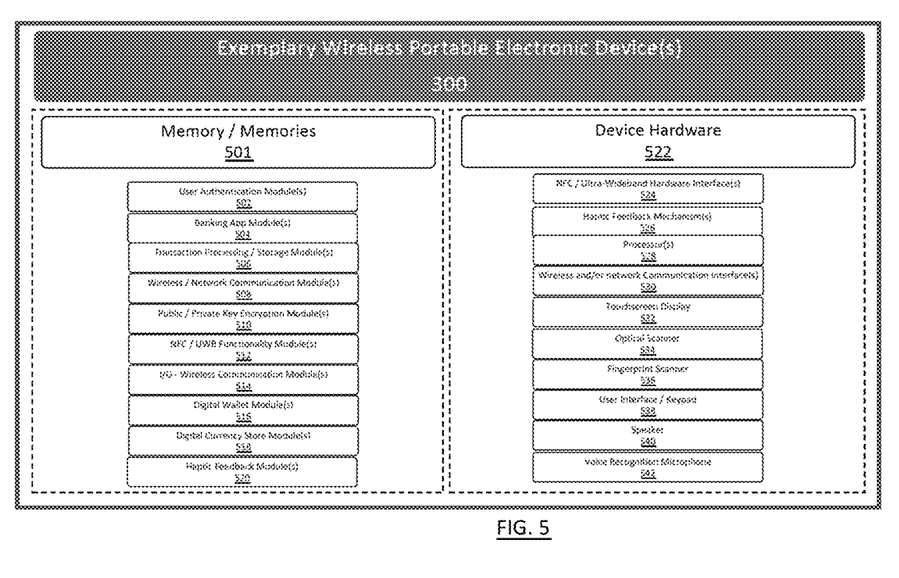
FIG. 5 depicts an exemplary wireless portable electronic device with a prepaid banking app in which the device has various hardware and memory components in accordance with one or more aspects of the disclosure.

FIG. 5 depicts an exemplary wireless portable electronic device 300 with a prepaid banking app in which the device has various hardware 522 and memory 501 components in accordance with one or more aspects of the disclosure.

User authentication module(s) 502 can be used by the device 300 in communication with ATMs 316 and banking servers 400 in order to authenticate the user in order to establish a session and/or recognize a device 300 corresponding to a user who has a non-checking non-savings prepaid digital currency store or like account. Prepaid banking app module(s) 304, 504 executed on processor(s) 528, can be used to facilitate execution of digital currency store transactions as well as to provide haptic feedback via haptic feedback module(s) 520 and haptic feedback mechanism(s) 526 if desired for such transactions. Similarly, processor(s) 528 may execute instructions to perform the functionality of any of the module(s) stored in memory 501. One type of preferable haptic feedback would be if the card 100 is out of wireless communication with device 300. This would prevent loss of the card if, for example, it was left at a location and the user walked away.

Transaction processing/storage module(s) 506 on device 300 can be used to set up a prepaid transaction, store a previously set up prepaid transaction, and/or locally handle a prepaid transaction at an ATM 316 or POS machine 328. Wireless/network communication module(s) 508 and/or NFC/UWB functionality module(s) 512 can provide wireless local communication between the device 300, ATM 316, POS machine 328, and/or banking server 400 via network communication interface(s) 530 or the like.

Local public/private key encryption module(s) 510 may store key(s) received from banking server(s) 400 and/or generate keys that are communicated to server(s) 400 and thereafter distributed to ATMs 316 and/or POS machines 328. Either way, the public and private encryption keys stored in module(s) 510 can be used to establish and facilitate secure communications with device 300 via interfaces 524 and/or 530, and communication module(s) 508, 514.

As noted above, the non-checking non-savings prepaid digital currency store 340 may be implemented in various ways on the mobile device 300 and/or unified card 100 such as, for example, in digital currency store module 518, digital wallet module 516, and/or in prepaid banking app module 504 in memory 302.

Input to device 300 and/or output displays to provide information to the user may be accomplished through a touchscreen or non-touchscreen display 532, an optical scanner 534 such as for facial recognition or barcode or QR code scanning, a fingerprint scanner 536, and/or user interface/keypad 538. A speaker 540 may be included in device 300 to provide audible information and/or feedback to the user. If desired, the haptic feedback conveyed herein may provided audibly. A voice-recognition microphone 542 may also be included in 300 to enable voice commands or dictation in order to obviate, in whole or in part, manual key entries or manual interactions with the device.

FIG. 6 illustrates the geo-locating functionality to locate lost prepaid banking cards by use of UWB and/or NFC technology or networking in accordance with one or more aspects of the disclosure.

As noted previously, unified card 100 is preferably enabled with secure wireless communication semiconductor(s) 108 that are able to communicate by NFC and/or UWB with geographically distributed NFC/UWB enabled devices 600, 602, 604, 606. This communication allows triangulation or other location detection of the unified card 100 when within wireless range of one or more devices 600, 602, 604, 606. The location information may be provided to mobile device 300 directly via Wi-Fi, Bluetooth, NFC, and/or UWB, and/or provided indirectly to banking server 400 via Internet 314, which can then relay the location information and potentially directions 608 for the lost card 100 to mobile device 300 via the Internet 314.

Figure 7:
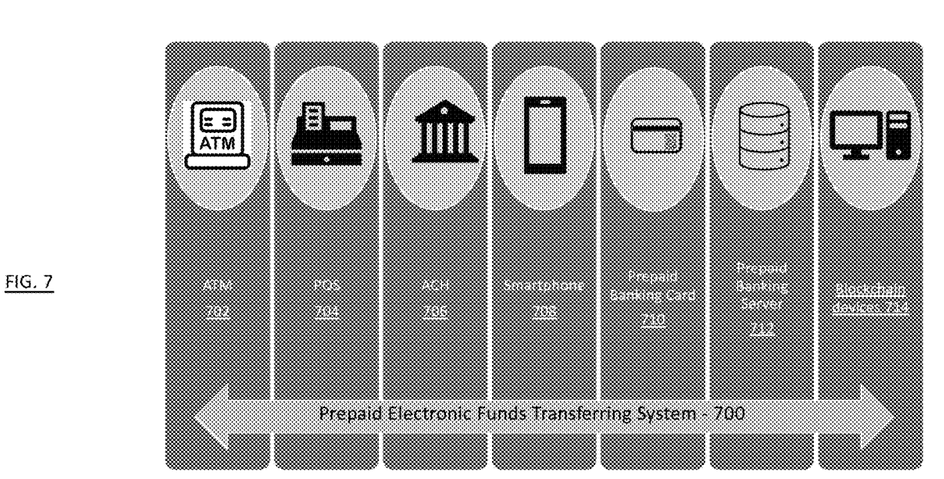
FIG. 7 shows various potential high-level interconnected components of a prepaid electronic funds transferring system in accordance with one or more aspects of the disclosure.

FIG. 7 shows various potential components of a prepaid electronic funds transferring system 700 in accordance with one or more aspects of the disclosure. In short, the non-checking non-savings prepaid digital currency store 340 of this disclosure may be implemented in a banking app on a smartphone 708 or in the form of a prepaid banking card 710. The prepaid currency store may be accessed, credited, debited, transferred, and/or other transactions may be performed by various interconnected devices such as ATMs 702, POS machines 704, automated clearing houses 706, prepaid banking server 712, and/or 714.

Figure 8:
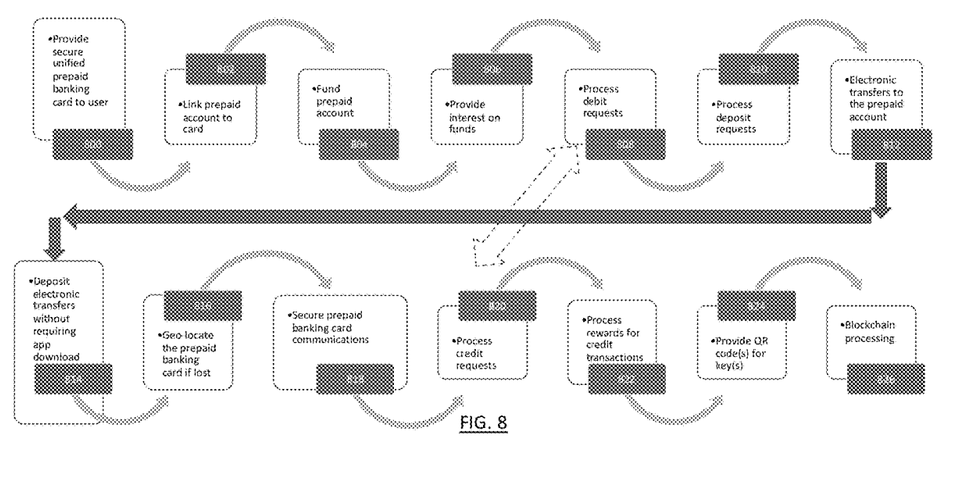
FIG. 8 is a sample process flow diagram for implementing one or more aspects of the disclosure to provide a secured, unified, multifunctional digital currency store for use with physical prepaid cards and/or mobile smart devices.

FIG. 8 is a sample process flow diagram for implementing one or more aspects of the disclosure to provide a method that can be used based on interactions with the smartphone and automated teller machine(s) (ATMs) and/or a point-of-sale machine(s) (POS).

In step 800, an institution or holding facility can provide a secure unified prepaid banking card 100 to the user. A prepaid banking server 400 can link a non-checking non-savings prepaid account to the card 100 in step 802, fund the prepaid account with an initial or other amount in step 804, provide interest on some or all funds held in the prepaid account in step 806, process debit requests in step 808 and/or credit requests in step 820 from ATMs 316 or POS machines 328 if the debit/credit request is equal to or less than the amount in the prepaid account, and process deposit requests in step 810 for deposits received at an ATM 316 or other means.

The prepaid banking server 400 can receive electronic transfers to the prepaid account in step 812 and can deposit in the prepaid account the electronic transfers preferably without requiring the user to download a prepaid banking server app or other app to the user's smartphone in step 814. Wireless communication between the card 100, smartphone 300, ATMs 316, and/or POS machines 328 can be accomplished via Bluetooth, Wi-Fi, UWB, NFC, or the like in secure wireless transaction semiconductor(s) 110. Geo-locating of the card, if lost, can similarly be accomplished by wireless means in step 816 by secure wireless NFC/UWB geo-locating semiconductor(s) 108. Communications between the card and/or smartphone and either ATMs or POS machines can be secured with one or more security chip(s) 114 to secure both wireless and/or non-wireless communications in step 818. Rewards for credit purchases may be processed in step 822.

One or more quick reference (QR) codes 112, 202, 307 may be used to identify the prepaid banking account and/or associated public encryption key(s) and/or private encryption key(s) in step 824. The keys may be used in order to facilitate blockchain transaction implementation 338 in step 826.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A secure unified banking card for use in transactions in a prepaid electronic funds transferring system that includes an automated teller machines (ATM) and point-of-sale machine (POS), said card comprising:
   a) a metal or plastic laminate;
   b) geo-locating means for geo-locating the laminated card if lost, the geo-locating means embedded within the laminate;
   c) secure wireless communication means to secure wireless communications with the ATM and the POS to facilitate deposits, withdrawals, credit charges, and transfers for a non-checking non-savings prepaid digital currency store associated with the card, said secure wireless communication means embedded within the laminate;
   d) security chip means to enable secure non-wireless communications when the card is physically inserted into the ATM or the POS to facilitate the deposits, the withdrawals, the credit charges, and the transfers for the prepaid digital currency store associated with the card, said security chip means embedded within the laminate;
   e) a machine-readable magnetic strip on the laminate to identify the prepaid digital currency store;
   f) a first machine-readable quick reference (QR) code printed on the laminate that is a public encryption key for the prepaid digital currency store; and
   g) a second machine-readable quick reference (QR) code printed on the laminate that is a private encryption key for the prepaid digital currency store,
   wherein said card is able to be used to at the ATM as a debit card and at a POS as a credit card, and wherein the prepaid digital currency store bears interest that is calculated daily and applied daily to the prepaid digital currency store, and further wherein the transactions are only funded when sufficient funds are available in the prepaid digital currency store.

2. The secure unified banking card of claim 1 wherein the geo-locating means includes either at least one near field communications (NFC) semiconductor or at least one ultra-wideband (UWB) semiconductor.

3. The secure unified banking card of claim 1 wherein the geo-locating means includes at least one near field communications (NFC) semiconductor and at least one ultra-wideband (UWB) semiconductor.

4. The secure unified banking card of claim 1 wherein the card includes means for providing cold storage of currency corresponding to the prepaid digital currency store.

5. A prepaid electronic funds transferring system for a user with a smartphone that does not have a checking account or a savings account to use with an automated teller machine (ATM) and a point-of-sale machine (POS) comprising the steps of:
   a) a secure unified prepaid banking card for the user having:
      i) a first security chip to enable secure non-wireless transactions between the secure unified prepaid banking card and the ATM and the POS;
      ii) a second security chip to enable secure wireless transactions between the secure unified prepaid banking card and the ATM and the POS;
   b) a prepaid banking server operatively linked to the secure unified prepaid banking card, said prepaid banking server including:
      i) a non-checking non-savings prepaid digital currency store for the secure unified prepaid banking card, said non-checking non-savings prepaid digital currency store funded with an amount;
      ii) interest calculation means to calculate daily interest on the amount in the prepaid digital currency store and to add said interest to the amount on a daily basis;
      iii) debit processing means to process a debit request from the ATM or the POS if the debit request is equal to or less than the amount in the prepaid digital currency store;
      iv) deposit processing means to process a deposit request for a deposit received at the ATM;
      v) receiving means to receive an electronic transfer to the prepaid digital currency store;
      vi) deposit means to deposit in the prepaid digital currency store the electronic transfer without requiring the user to download a prepaid banking server app to the user's smartphone; and
      vii) geo-locating means to locate the secure unified prepaid banking card by near field communications (NFC) or ultra-wideband (UWB) if the secure unified prepaid banking card is lost by the user.

6. The prepaid electronic funds transferring system of claim 5 wherein the prepaid banking server further comprises: processing means to process a credit request from the POS if the credit request is equal to or less than the amount in the prepaid digital currency store.

7. The prepaid electronic funds transferring system of claim 5 wherein the secure unified prepaid banking card further comprises: first quick reference (QR) code to identify the prepaid digital currency store.

8. The prepaid electronic funds transferring system of claim 5 wherein the secure unified prepaid banking card further comprises: a first quick reference (QR) code to identify a public encryption key for the prepaid digital currency store.

9. The prepaid electronic funds transferring system of claim 6 wherein the prepaid banking server further comprises: awarding means to provide rewards for the credit request if the credit request is equal to or less than the amount in the prepaid digital currency store.

10. The prepaid electronic funds transferring system of claim 9 wherein the secure unified prepaid banking card further comprises: a second quick reference (QR) code to identify a private encryption key for the prepaid digital currency store.

11. The prepaid electronic funds transferring system of claim 10 wherein the public encryption key and the private encryption key are used in blockchain ledgers on a plurality of blockchain devices.

\* \* \* \* \*